United States Patent [19]
Garcia et al.

[11] Patent Number: 5,621,015
[45] Date of Patent: Apr. 15, 1997

[54] PROCESS FOR THE TREATING OF SURFACES OF THERMOPLASTIC ADDITIVES

[75] Inventors: Rodrigo A. Garcia, Montgomery, Tex.; Joseph G. Gho, Vancouver, Canada

[73] Assignee: Gaia Reserch Limited Partnership, Conroe, Tex.

[21] Appl. No.: 321,236

[22] Filed: Oct. 11, 1994

Related U.S. Application Data

[62] Division of Ser. No. 61,102, May 13, 1993, which is a division of Ser. No. 974,109, Nov. 10, 1992, Pat. No. 5,234,963, which is a continuation-in-part of Ser. No. 882,279, May 13, 1992, abandoned.

[51] Int. Cl.$^6$ ................................. B05D 7/00; C08J 9/00
[52] U.S. Cl. ............................ 521/76; 427/212; 521/57
[58] Field of Search ..................... 521/76, 57; 427/212

[56] References Cited

U.S. PATENT DOCUMENTS

| | | | |
|---|---|---|---|
| 5,009,809 | 4/1991 | Kosin et al. | 252/350 |
| 5,009,810 | 4/1991 | Wason et al. | 521/56 |
| 5,037,580 | 8/1991 | Garcia et al. | 252/350 |
| 5,045,570 | 9/1991 | Mooney et al. | 521/88 |
| 5,071,884 | 12/1991 | Malone | 521/57 |
| 5,106,534 | 4/1992 | Wason et al. | 252/350 |
| 5,110,841 | 5/1992 | Malone | 521/57 |
| 5,234,963 | 8/1993 | Garcia et al. | 54/76 |
| 5,252,618 | 10/1993 | Garcia et al. | 521/57 |

*Primary Examiner*—Morton Foelak
*Attorney, Agent, or Firm*—Kurt S. Myers

[57] ABSTRACT

The present invention is directed to a process for the treating of surfaces of thermoplastic additives having the propensity to be hydrophilic by blending glycerol tristearate with the additive in a high intensity mixer.

5 Claims, 1 Drawing Sheet

PROCESS FOR THE TREATING OF SURFACES OF THERMOPLASTIC ADDITIVES

CROSS-REFERENCE TO RELATED APPLICATIONS

This application is a divisional application of U.S. patent application Ser. No. 08/061,102 filed May 13, 1993 entitled "PRODUCTION OF ENCAPSULATED CHEMICAL FOAMING CONCENTRATES" which in turn is a divisional application of U.S. patent application Ser. No. 07/974,109 filed Nov. 10, 1992 entitled "PRODUCTION OF ENCAPSULATED CHEMICAL FOAMING CONCENTRATES", now U.S. Pat. No. 5,234,963, which in turn is a continuation-in-part application of U.S. patent application Ser. No. 07/882,279 filed May 13, 1992 entitled "PRODUCTION OF ENCAPSULATED CHEMICAL FOAMING CONCENTRATES", now abandoned.

FIELD OF THE INVENTION

The present invention is directed to the process and apparatus for the production of encapsulated chemical foaming concentrates which includes the compounding of chemical foaming agents in a resin carrier and pelletizing the concentrate under water at such conditions that the chemical foaming agent is encapsulated. These uniquely encapsulated and pelletized chemical foaming concentrates are used for foaming thermoplastics. More specifically, one embodiment of the present invention is the encapsulating of an endothermic foaming agent such as citric acid and sodium bicarbonate in a resin carrier which when incorporated into a thermoplastic polymer to be foamed will react to form carbon dioxide as the active foaming gas. Another embodiment of the present invention is the encapsulating of an exothermic foaming agent such as an azo compound or a hydride in a resin carrier which when incorporated into a thermoplastic polymer to be foamed will react to form nitrogen or hydrogen respectively as the active foaming gas. Still another embodiment of the present invention is the encapsulating of an endothermic foaming agent with an exothermic foaming agent at levels from 10/90 to 90/10 wt % to obtain a hybrid foaming agent concentrate exhibiting the best properties of each foaming agent system.

BACKGROUND OF THE INVENTION

Foaming of thermoplastics in the majority of applications is now accomplished with exothermic foaming agents, usually azo compounds, which when admixed with the desired thermoplastic polymer in an extruder or molding machine are heated above their decomposition temperatures, and produces nitrogen which forms the cell structure in the molded or extruded part. However, in the compounding and producing of concentrates of these exothermic foaming materials the chemical reaction of the foaming agents is not suppressed in any of the current processes employed. Approaches vary, one is compounding the exothermic foaming agents in a very low melting material so that when mixing the foaming agent with the material the decomposition temperature is not reached; however, the low melting material may not be fully compatible with the desired thermoplastic polymer used to produce a foamed part or product. Another approach is to attempt to produce the concentrate at maximum flow rates or minimum residence times in the extruder. However, the conditions heretofore used are often contrary to controlling the decomposition of the foaming agent and the foaming agent reacts, releasing the gas and the pellets containing the foaming agent are already foamed or have lost the gas. These pellets are larger than the desired pellet size and have an outer surface which shows the loss of gas. Therefore, when such pellets are added to the thermoplastic resin desired to be foamed there is a non-uniform amount of unreacted chemical foaming compounds in these pellets to foam the thermoplastic and the foamed product is neither consistent nor uniform causing substantial off-specification and rejected product.

Attempts to produce endothermic chemical foaming concentrates in the high melting thermoplastic resins has not been attempted since the temperatures in an extruder to compound exceed the reaction temperature of such foaming agents. Attempts may have been made to foam thermoplastic polymers with endothermic chemical foaming agents by mixing them in waxy carriers; however, the ability to mix the foaming agent uniformly with a high melting polymer in a single pass through an extruder and produce a consistent foamed product was impossible due to melting temperature parameters between the waxy material, the foaming agents and the high melting thermoplastic resins such as polypropylene, polystyrene or polyethylene to be foamed.

U.S. Pat. Nos. 5,037,580; 5,045,570; 5,009,809 and 5,009,810 disclose chemical foaming agents specifically a polycarboxylic acid and an inorganic carbonate which are surface treated before compounding with materials such as mono-glycerides, stearic acid, silane coupling agents, fatty acids, titanates and mixtures thereof. In each patent, the admonition is given regarding compounding that: "The extruder must, however, be operated below about 149° C. in order to keep the endothermic blowing agent from foaming prematurely." Hence, it is clear from the patents themselves that these foaming agents were not to be compounded in high melting resins that had melting or compounding temperatures above 149° C. The patents also disclose as the material to surface treat the blowing agent a component selected from the group monoglycerides, stearic acid, silane coupling agents and mixtures thereof. U.S. Pat. No. 5,045,570 additionally includes the di-glycerides, fatty acids, fatty acid salts, hydrotitinates and zirconates as materials to surface treat the blowing agents.

SUMMARY OF THE INVENTION

The present invention is directed to the process and apparatus for compounding and pelletizing of chemical foaming agents in a high temperature melting resin carrier (resins melting above 149° C.) and producing unique, uniform encapsulated and pelletized chemical foaming concentrates. More specifically, the present invention is directed to the compounding, encapsulating and pelletizing in a high temperature melting resin carrier, at highly loaded concentrations (5 to 70 wt %), of a foaming agent selected from an endothermic foaming agent, an exothermic foaming agent or a hybrid combination of endothermic and exothermic foaming agents such that when incorporated into a thermoplastic resin to produce a foamed product will chemically react to form a carbon dioxide, nitrogen, hydrogen or mixtures thereof as the active foaming gas.

BRIEF DESCRIPTION OF THE PREFERRED EMBODIMENTS

Figure 1:
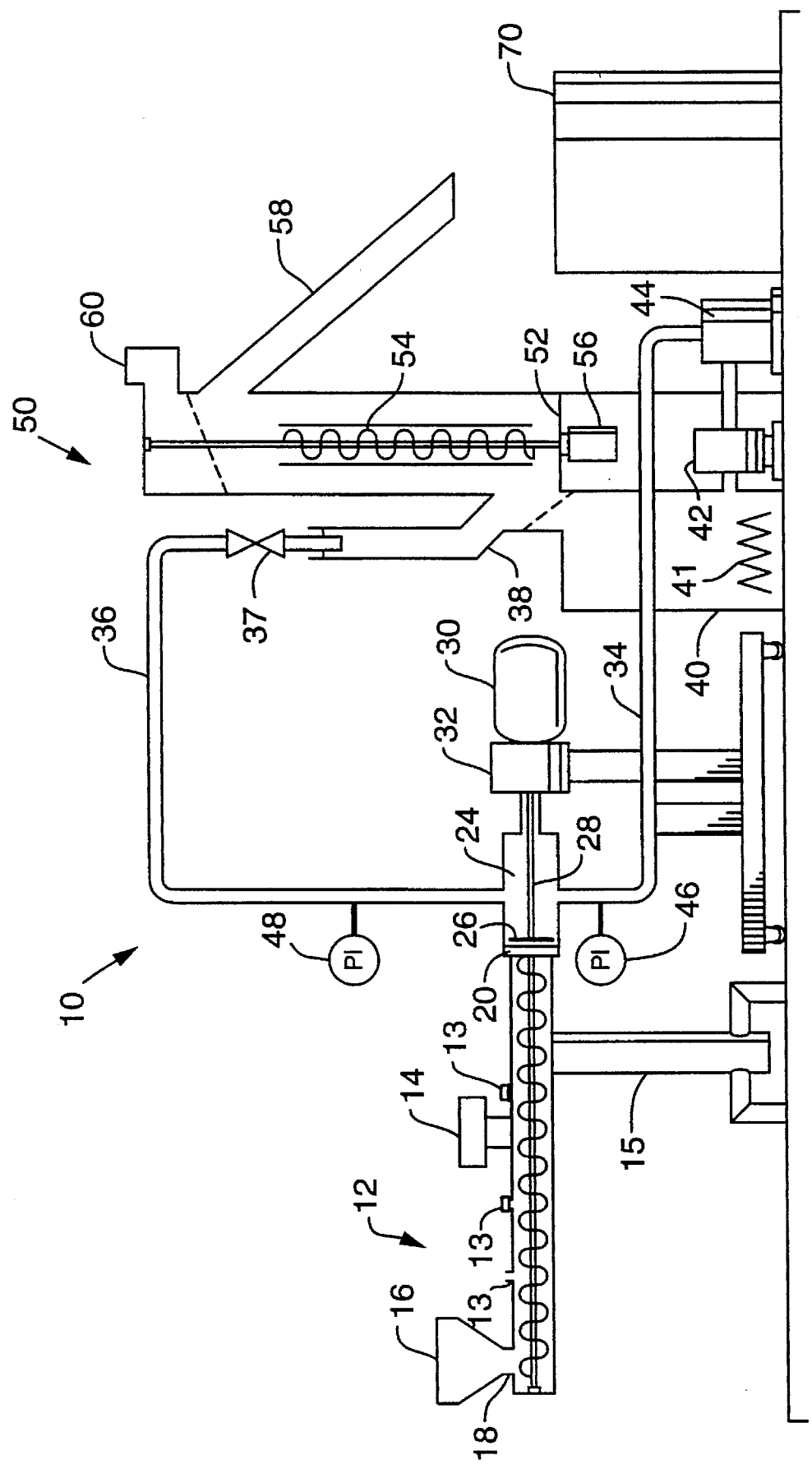
FIG. 1 is an elevational schematic of the preferred equipment which is used to carry out the compounding, encapsulation and pelletizing of a high melting resin carrier and chemical foaming agents to produce foaming agent concentrates (5 to 70 wt % active levels) according to the present invention.

According to the present invention, a foaming agent concentrate of an endothermic chemical foaming agent, an exothermic chemical foaming agent or a hybrid mixture of endothermic and exothermic foaming agents is compounded and encapsulated in a resin carrier, without foaming occurring so that the encapsulated and pelletized concentrate may be blended uniformly with the desired thermoplastic resin and passed through an extruder or injection molding machine for production of a consistent foamed product. The uniqueness of the process of the present invention allows the carrier to be a high melting thermoplastic resin and thus be the same resin which is to be foamed; for example if high density polyethylene is foamed the carrier chosen is high density polyethylene. However, the resin carrier need not be the identical resin but a resin having a lower melting point or lower density but is compatible with the thermoplastic being foamed. What is common to the foaming concentrates of the present invention is the process by which they are produced.

The process for the production of a foaming agent concentrate according to the present invention comprises compounding or mixing a resin carrier with the chemical foaming agent under processing or mixing zones of higher operating pressures, forcing the mixture of foaming agent and resin carrier through a die forming strands of mixture, and pelletizing under water the strands using pressurized and cooled water to quickly cool and solidify the outer surface of the resin carrier and to encapsulate the foaming agents in the carrier, the encapsulation occurring under water at water pressures between 10 and 200 pounds per square inch gauge (psig) and water temperatures between 40° and 180° F. It has been found that when the carrier and foaming agent mixture is rapidly cooled and a positive pressure is maintained in the water cutting or pelletizing chamber, the chemical foaming agent is encapsulated without substantial reaction within the resin carrier as a pelletized concentrate. By substantial reaction is meant, that the pellets produced by the process of the present invention differ from the pellets of foaming agents now produced in that the gases formed, if any, are entrapped in the resin carrier. In contrast, pellets of foaming agents now produced use lower melting materials, often waxes, to reduce reaction and gas release or alternately the pellets are foamed or even collapsed showing evidence of reaction of the foaming agent during the compounding of the foaming agents (these pellets increasing in size before collapse). With pellet concentrates (containing 5 to 70 wt % unreacted foaming agents) of the present invention, the chemical reaction of the chemical foaming agent is contained, prevented or suppressed due to the sudden freezing or solidification of the resin carrier which keeps the gas, either carbon dioxide, nitrogen or hydrogen or mixtures thereof, if any is formed, from escaping from the encapsulated chemical foaming concentrate pellets thus containing, preventing or suppressing the chemical reaction. In the present invention the concentrate pellets contain in each pellet all the foaming agent necessary for the chemical reaction to occur to produce the active foaming gas so that the addition of these concentrate pellets with thermoplastic resins in an injection molding machine, for example, produce a uniform product with higher concentrations of foaming gas than heretofore obtained. For example, if an acid and base are foaming agents, both acid and base are in the same concentrate pellet at concentrations that will provide more foaming gas than obtained by previous methods.

Referring now to FIG. 1, the apparatus 10 used to carry out the process of the present invention is shown. The compounding, encapsulating and pelletizing apparatus 10 includes a compounding or mixing extruder 12. An extruder having more than one mixing zone is preferred; however, the extruder is required to have the operating pressures in each operating or mixing zone essentially the same or slightly higher. The operating pressures in the zones are maintained such that the chemical reaction of the foaming agent is contained, prevented or suppressed and no substantial decrease in operating pressure is permitted which allows the gaseous reaction product of the foaming agents to be produced even though the temperatures exceed reaction or decomposition temperatures of the foaming agents. When water is present either as part of the thermoplastic carrier resin or the foaming agents, the water must be removed before the foaming agents and carrier resin are compounded or throughly mixed and reach the reaction temperature of the foaming agents. In the initial stage of the extruder 12, as the temperature of the resin is brought to its melting temperature, the mixture is raised to a temperature above 212° F., the boiling point of water, and in that zone the water is vented through a vent 13, which may either be opened to the atmosphere or connected to vacuum. Even before the foaming agents are added to the extruder 12, any water is removed from the foaming agents by a separate piece of equipment such as a drier. Extruder 12 may be a single screw extruder but a double screw mixing extruder having a plurality of vents 13 is preferred. The extruder may have a side feeder 14. The extruder 12 is mounted on a pedestal or base 15 which may be on rollers (not shown). In most instances the chemical foaming agents together with a resin carrier are introduced into the hopper 16 of the extruder 12, while venting water through a vent 13. In other instances, the chemical foaming agents or the resin carrier are added through the side feeder 14. As will be explained in more detail hereinafter, the resin carrier of the present invention is preferably a high temperature melting resin and usually a thermoplastic resin which is essentially the same as the desired thermoplastic to be foamed. According to the present invention, if polyethylene is to be foamed, the carrier resin used to form the concentrate is preferably polyethylene; if polycarbonate is to be foamed, then the carrier resin is preferably polycarbonate or polystyrene is to be foamed, then the carrier resin is preferably polystyrene. This preference is not meant to infer that a foaming agent concentrate of the present invention using one carrier resin cannot be used to foam another thermoplastic resin. The melt index of the carrier resin may be higher than that of the resin being foamed. The hopper 16 is kept one-third to two-third full so that the neck 18 of the hopper 16 is full for a single screw extruder. With a twin screw extruder, this condition is not necessary. The chemical foaming agents are compounded with the resin carrier in the extruder as the mixture move from the side feeder 14 or hopper 16 to a die 20. It is noted that the extruder 12 has no screen pack or other structure such as vents or entry points which will permit any pressure drops once the reaction temperature of the foaming agents is reached or more specifically, no structure which permits the foaming gases to form and escape from the extruder 12, thus preventing the reaction of the chemical foaming agents to begin during the compounding even though the temperature is at or above the temperature for the reaction to occur. The die 20 has a short land, meaning the distance the materials flow through the die from inside the extruder to the outside of the die. The land lengths are less than 0.25 inches which is half to one-quarter the land length of a normal die. The number of opening and size of the opening in the die 20 may vary depending on the materials being concentrated but generally a die having a single circle of die openings of about 0.085 to 0.125 inches in diameter will be suitable for most thermoplastic resins.

A water chamber or water cutting and pelletizing chamber 24 surrounds the outer surface of die 20 and is connected directly to the end of the extruder 12. In chamber 24 is an under water pelletizer which cuts the strands of foaming agent concentrate which is forced through the die opening in die 20. Rotating in chamber 24 are a plurality of cutters 26 which are on the end of rod 28 and are essentially in contact with the outer face of die 20. The cutters 26 are within 1/64 inch from the face of die 20, and the number of cutters 26 and speed of rotation are such that the pellets formed are the standard size of 1/8 inch in length. The rod 28 may be rotated at a desired speed by motor 30 and adjusted by a gear box 32. The strands of compounded chemical foaming agents which are forced out the die openings are immediately cut off into pellets, the cutting or pelletizing being done under the water which fills the chamber 24. It has been observed that no foaming occurs as the strands first come from the die and are cut even with a pressure let down. Of significance to the present invention, the chamber 24 is maintained under a positive pressure and the water is cooled so that the outer surface of the pellets formed are quickly solidified or more specifically, the viscosity of the resin is increased to encapsulate the chemical foaming agent pellet concentrates. The pellets are encapsulated before the gaseous reaction product is produced and released, the reaction cannot occur and is contained, prevented or suppressed while in the extruder and is encapsulated before the reaction occurs in the water chamber 24. Even though there is a pressure drop from the end of the die 20 into the chamber 24, the conditions in the chamber 24 including the time before the strand is cut to form a pellet are such that encapsulation occurs and the chemical reaction between the foaming agents is contained, prevented or suppressed. These conditions are in direct contrast to conditions now used in attempting to produce foaming agent concentrates where the carrier used is as low melting as possible so that the mixture is extruded at the lowest possible temperature and where the concentrate mixture is extruded into a chamber that does not have sufficient positive pressures to contain, prevent or suppress the chemical reaction of the foaming agent.

The pressure and temperature of the water in chamber 24 is controlled in most part by the pressure and temperature of the water entering by line 34 into chamber 24. The encapsulated and pelletized pellets of the chemical foaming agents are removed from the chamber 24 by line 36. The height or head of line 36 will also be a part of the pressure/temperature control. Specifically, a gate valve 37 controls back or head pressure in line 36. Line 36 empties into a separation duct 38 which has a number of screens (not shown) which separate the pellets from the water. The pellets are directed to a drier 50 and the water is directed to a reservoir 40. The water in the reservoir 40 may be heated by heater 41, if necessary or during start-up, and is recycled to chamber 24 by pump 42. Pump 42 is larger than conventional pumps used in under water pelletizers and provides the desired positive pressure in the water chamber 24. The size of pump 42 will need to correspond to any desired pressure in the system. Before returning to the chamber 24, the water is cooled in chiller 44. The desired pressure in chamber 24 is controlled not only by the pressure of pump 42 but by the height or head of line 36 or gate valve 37 prior to discharge of line 36 into drier 50. The pressure in the water system is measured by gauges 46 or 48. Gauge 48 is usually the gauge used to measure the pressure in chamber 24 and control the water system. The temperature in chamber 24 is controlled by the amount of cooling done in chiller 44. The availability of cold water and the season will determine the amount of cooling necessary before the water leaving chiller 44 enters line 34 for return to chamber 24. The drier 50 comprises a series of air jets (not shown) in the bottom wall 52. Central to the drier 50 is a lift auger 54 which is rotated by motor 56. The lifting of the pellets in the presence of the dry air stream removes the water and the dried pellets are removed from the drier 50 by outlet pipe 58. Air and entrained water is removed by outlet 60 at the top of drier 50. The dried pellets are collected on a classifier or in a lined box 70. A classifier 70 is preferred in that the vibration will remove any water that comes over with the pellets from the drier 50.

The chemical foaming agent concentrates of the present invention, by employing the above described equipment and process conditions, exhibit the same color and appearance of the carrier resin. The concentrate pellets of the present invention are clear and have a generally uniform size. In contrast, all competitive materials now in the market place are generally white in color due to foaming of the additive ingredients, are non-uniform in size, are larger than the desired and extruded pellet size and may include collapsed pellets.

While the apparatus 10 described is a preferred embodiment used to produce the encapsulated and pelletized chemical foaming agents of the present invention, the specifics of the apparatus and process will depend on the specific foaming agents used, water present and the specific carrier resin employed. For example, different temperatures are employed in the extruder 12 to compound and mix specific chemical foaming agents with a specific resin carrier (used to emphasis the resin which encapsulates the foaming agents to produce the concentrates of the present invention) due to the carrier's melting temperature as well as the temperature required for homogeneous mixing of the foaming agent and forcing the mixture through the extruder die 20, and likewise, the temperature of the water and the pressure within the water pelletizing chamber 24 will vary depending on the specific resin carrier employed. While not specifically shown in the schematic, a drier is used to dry the foaming agents so that no more than 1 to 2 wt % water is introduced to the extruder 12.

The foaming agents encapsulated or concentrated by the apparatus and process of the present invention are primarily for thermoplastic polymers or resins but may include certain rubbery materials. Thermoplastic resins which are now currently foamed include low density polyethylene (LDPE), high density polyethylene (HDPE), polypropylene (PP), polystyrene (PS), polycarbonates (PC), polyesters, nylon, and ABS, acetal, acrylic, ethylene vinylacetate coploymers (EVA), fluoroplastic, modified phenylene oxide based, polyurethane-thermoplastic, polysulfone polymers. These thermoplastic resins may be used as the resin carrier in producing the encapsulated foaming concentrates of the present invention. In addition, thermoplastic resins such as ethylene acrylic acid copolymer (EAA), ethylene methacrylic acid coploymers (EMA), polyvinylchlorides (PVC) and the ethylene-based copolymers neutralized with metal salts, forming ionic clusters and known as ionomers, which are not now commonly used to produce foamed products may be included as resin carriers for the foaming agents of the present invention. The inclusion of resins not used heretofore as well as the modified engineering resins which are presently becoming available illustrates that the process of the present invention extends the current technology for foaming thermoplastic polymers and resins.

The resin carrier employed usually is the same thermoplastic resin as the resin which is desired to be foamed. In other words, if high density polyethylene is the thermoplastic which will be foamed to produce a foamed polyethylene product with the encapsulated chemical foaming agents of the present invention, then polyethylene is used as the carrier resin. Since the carrier resin becomes part of the foamed product, the polyethylene used as the carrier resin may be the same as the polyethylene to be foamed. In some instances the resin carrier will not be the identical thermoplastic resin as the resin to be foamed. To make certain that the choice of resin carrier is understood, if the thermoplastic resin to be foamed is polycarbonate, then the resin carrier may be a polycarbonate. The choice of carrier heretofore was not completely based on the thermoplastic resin to be foamed but was a compromise between a low melting material that was compoundable with a specific foaming agent and was somewhat compatible with the desired thermoplastic resin. Even the choice of foaming agent was a compromise based on the reaction temperature of the foaming agent and the temperature required to melt and extrude the desired thermoplastic resin to be foamed. These compromises have been overcome by the process of the present invention. The choice of foaming agent and the resin carrier is now based on improving the performance of foaming the desired thermoplastic resin.

One significant feature of the present invention is that the apparatus and process of the present invention will encapsulate in a high temperature melting resin carrier an organic acid and a base which are endothermic chemical foaming agents. The encapsulation of endothermic foaming agents of the process of the present invention preferably include the encapsulation of a carbonate as the base and sufficient organic acid such that when incorporated in the desired thermoplastic resin the two agents react chemically to form carbon dioxide. Natural carbonates such as calcium carbonate or sodium bicarbonate are effective carbonates as one of the endothermic foaming agents of the present invention. Preferred carbonates are lithium carbonate and sodium bicarbonate. Synthetic carbonates also may be used. Synthetic carbonates such as the hydrotalcite-like compound, DHT-4A made by Kyowa Chemical Industry Co., Ltd., is a suitable carbonate for the foaming agents of the present invention. Other suitable synthetic carbonates are the dihydroxyaluminum sodium carbonates, dihydroxyaluminum calcium carbonates or the Halogard products made by Chattem Chemicals of Chattanooga, Tenn. While other carbonates may be used, either natural or synthetic, the carbonates specifically referred to herein are all FDA approved to be used in food grade resins or products handling food.

The organic acid used as the other part of the endothermic foaming agent of the present invention is preferably either malic or citric acid. Both acids are solids at room temperature and will react completely with a carbonate to form carbon dioxide and water. Any other organic acid which will react with the carbonate to form carbon dioxide and water may be used, even the lower molecular weight acids which are normally solids. Acids such as maleic acid, formic acid, glutaric, oxalic, succinic acid, fumaric and pyruvic acid which are normally solids at room temperature may be employed.

The carrier and endothermic foaming agents, preferably surface treated as will be described in more detail hereinafter, are premixed. The carrier thermoplastic resin, usually in the form of pellets or powder, is mixed with the endothermic chemical foaming agents, such as citric acid and sodium bicarbonate, in a ribbon or Henschel mixer. The amount of acid and carbonate are in stoichiometric amounts or the weight proportions in which the two specific materials react, and the combined amount of the two endothermic foaming agents is at least 5 to 70 wt % of the combined mixture. This mixture is introduced into the extruder 12 of the apparatus 10 of the present invention and compounded. The mixture is forced through a die 20 where the strands are cut under water maintained at a positive pressure greater than 15 psig and cooled. The outer surface of the carrier quickly solidifies and encapsulates the acid and base in the carrier resin.

The apparatus and process of the present invention also will encapsulate in a high temperature melting resin carrier exothermic chemical foaming agents. Exothermic chemical foaming agents include the azo compounds such as azodicarbonamide and modifications or derivatives thereof (CELOGEN AZ, CELOGEN AZ 3990, CELOGEN AZ NP products of Uniroyal Chemical, a div. of Uniroyal, Inc.) which on decomposition yield nitrogen, carbon monoxide and carbon dioxide; other compounds which yield nitrogen such as p,p-oxybis benzene sulfonyl hydrazide, other hydrazides or p-toluene sulfonyl semicarbazide, dihydroxydiazinone, 5-phenyltriazole; and compounds which yield hydrogen such as sodium borohydride or other hydrides all of which are encapsulated by the apparatus and process of the present invention.

Still further, the apparatus and process of the present invention will encapsulate in a high temperature melting resin carrier a hybrid of endothermic and exothermic chemical foaming agents. A hybrid encapsulated chemical foaming concentrate is produced by mixing both an endothermic foaming agent, for example, malic acid and lithium carbonate, with an exothermic foaming agent, for example, sodium borohydide. The concentration of each foaming agent ranges such that the ratio of endothermic to exothermic is between 10/90 and 90/10 wt %.

The encapsulated foaming agents of the present invention are illustrated by the following examples.

EXAMPLE 1

An endothermic encapsulated foaming agent concentrate is produced with high density polyethylene at a chemical foaming agent concentration of 25 wt %. The blend of organic acid to base is at a ratio of 0.7/1.0 (41.2 wt % acid/58.8 wt % base). A specific formula consists of the following:

a) 75 wt % TR885 HDPE (a high density polyethylene product of Phillips Chemical Company);

b) 10.3 wt % citric acid;

c) 14.7 wt % sodium bicarbonate.

Components b) and c) are each separately pretreated with 1 to 10 wt % glycerol monostearate or pentaerithritol teta-stearate in a Henschel mixer.

The component a) and pretreated components b) and c) are premixed in a Henschel mixer or a ribbon blender and introduced to an extruder as described in FIG. 1. The extruder is a twin screw Werner & Pfleiderer extruder, the die has a single circle of 12 openings having a 0.100 inch diameter. The conditions in the water chamber are maintained at 10 to 60 psig and at a temperature of between 40° and 130° F.

The pelletized concentrate produced is a uniform pellet in size and shape, with no collapsed pellets or pellets which are foamed.

EXAMPLE 2

An endothermic encapsulated foaming agent concentrate is produced similarly as in Example 1 except malic acid and lithium carbonate are used. It has been found that this combination of foaming agent concentrate produces a very small and uniform cell structure when incorporated into polyethylene to produce the foamed polyethylene.

EXAMPLE 3

An endothermic encapsulated foaming agent concentrate is produced with polycarbonate at a chemical foaming agent concentration of 25 wt %. A specific formula consists of the following:

a) 75 wt % CD200 PC (a polycarbonate product of Mobay Chemical Company);

b) 18.75 wt % malic acid (a product of Barteck Chemical Company);

c) 6.25 wt % lithium carbonate (a product of Cyprus Chemicals).

Components b) and c) are each separately pretreated with 1 to 10 wt % glycerol monostearate or pentaerithritol teta-stearate in a Henschel mixer.

The component a) and the pretreated components b) and c) are premixed in a Henschel mixer or a ribbon blender and introduced to an extruder as described in Example 1. The conditions in the extruder are at higher temperatures because the functional carrier is polycarbonate; however, the conditions in the water chamber are approximately the same as in Example 1.

EXAMPLE 4

An exothermic encapsulated foaming agent concentrate is produced with high density polyethylene at a chemical foaming agent concentration of 25 wt %. A specific formula consists of the following:

a) 75 wt % TR885 HDPE (a high density polyethylene product of Phillips Chemical Company);

b) 25 wt % CELOGEN AZ (an azodicarbonamide product of Uniroyal Chemical).

The components a) and b) are premixed in a Henschel mixer or a ribbon blender and introduced to an extruder as described in Example 1. The conditions in the water chamber are maintained at 15 to 100 psig and at a temperature of between 40° and 130° F.

The pellets produced are uniform in size and shape, with no collapsed pellets or pellets which are foamed.

EXAMPLE 5

An exothermic encapsulated foaming agent concentrate is produced similarly as in Example 4 except CELOGEN TSH or CELOGEN OT (a p-toluene sulfonyl hydrazide or p,p-oxybis benzene sulfonyl hydrazide product of Uniroyal Chemical) or sodium borohydride are used.

EXAMPLE 6

A hybrid endothermic and exothermic encapsulated foaming agent concentrate is produced with high density polyethylene at a chemical foaming agent concentration of 25 wt %. A specific formula consists of the following:

a) 75 wt % TR885 HDPE (a high density polyethylene product of Phillips Chemical Company);

b) 20 wt % CELOGEN AZ (an azodicarbonamide product of Uniroyal Chemical);

c) 2.06 wt % citric acid; and d) 2.94 wt % sodium bicarbonate.

Components c) and d) are each separately pretreated with 1 to 10 wt % glycerol monostearate or pentaerithritol teta-stearate in a Henschel mixer.

The components a), b) and pretreated components c) and d) are premixed in a Henschel mixer or a ribbon blender and introduced to an extruder as described in Example 1. The conditions in the water chamber are maintained at 15 to 100 psig and at a temperature of between 40° and 130° F.

The pellets produced are uniform in size and shape, with no collapsed pellets or pellets which are foamed in the concentrate produced.

A material having very different characteristics than known treating materials, such as glycerol monostearate or pentaerithritol teta-stearate used in the previous Examples, has been found to sur face treat the foaming agents or more specifically each component of the foaming agent composition which has any propensity to be hydrophilic. This material is glycerol tristearate (GTS) a product of PATCO, a division of American Ingredients. Each component of the foaming agent is treated separately by adding the component, such as the sodium bicarbonate or citric acid powder, to a high intensity mixer. Such a mixer is a Henschel mixer and enough foaming agent component is added to cover the blades. The mixer is started at low speeds and added to the component is 2 wt % of glycerol tristearate (GTS), based on the weight of component added to the mixer. Although 2 wt % of the GTS is preferred, levels of 0.5 wt % to 10 wt % may be used to surface treat the foaming agent components and all materials which may be added to the composition which may be hydrophilic. A hydrophobic foaming agents, such as the azo materials, do not require surface treating. The mixer blends the mixture on high speeds for approximately 2 minutes. A maximum of 4 minutes of mixing is sufficient to treat the component. The surface treatment is conducted at room temperature and no high temperatures or long periods of mixing are required unlike the procedure required for known materials, such as when using the glycerol monostearate. To test the characteristics of a foaming agent component treated with GTS, the surface treated powder is dropped into water and the powder floats on the surface. Without the surface treating of the foaming agent with the GTS, the powder when dropped into water will settle to the bottom of the vessel holding the water. This surface treating step will enhance the quality of the foaming agent concentrates of the present invention in that the ultimate objective is to eliminate all water prior to the compounding of the concentrate.

The elimination of water prior to the compounding step must be emphasized to obtain an optimum concentrate product. To eliminate water, the foaming agents are first dried. Then the dried foaming agents are surface treated. The surface treating of the foaming agent components is one way to eliminate water by making sure that water is not absorbed by the foaming agents and brought into the system with any of the components making up the concentrate. Most of the carbonate components and acid components are materials which will absorb water. Another step which has been found successful to the elimination of water is to vent the extruder at a point before reaching the reaction temperature of the foaming agents to form the reaction gas. Thus, the venting in the stage immediately after the components of the foaming agent concentrate are added to the extruder will take off water (heating the mixture or materials above 212° F.) but before the reaction temperatures of the foaming agents is reached.

Additional examples are set forth, which emphasize the elimination of water which illustrate conditions of operation for long run periods which are not always obtainable when even small amounts of water enter the extruder during the concentration process.

EXAMPLE 7

To 49 pounds of dihydroxyaluminum sodium carbonate (DASC, a product of Chattem Chemical) in a Henschel mixer operating at low speed is added 1 pound (2 wt %) of glycerol tristearate (a product of PATCO). The mixer is turned to high speed for approximately 2 minutes to blend the mixture. A sample of the mixture is dropped into water and the DASC powder floats on the surface.

This simple procedure is used to treat or surface coat all components of the foaming agent concentrate that has any propensity to be hydrophilic. Other carbonates, such as sodium bicarbonate or aluminum hydroxide magnesium carbonate or the acids such as citric acid or malic acid are treated by this same simple procedure.

EXAMPLE 8

An endothermic encapsulated foaming agent concentrate is produced with an ethylene vinylacetate copolymer carrier resin at a chemical foaming agent concentration of 25 wt %. A specific formulation consists of the following:

a) 74.5 wt % ethylene vinylacetate copolymer;

b) 10.3 wt % citric acid;

c) 14.7 wt % of a mixture of sodium bicarbonate, dihydroxyaluminum sodium carbonate (DASC) and aluminum hydroxide magnesium carbonate (HALOGARD AM, a product of Chattem Chemical);

d) 0.5 wt % calcium oxide.

Component b) and each of the components of c) are treated as set forth in Example 7 above.

The component a) and the pretreated components b) and c) together with the calcium oxide are premixed in a Henschel mixer and then introduced into an extruder as described in FIG. 1. The extruder is a twin screw Werner & Pfleiderer extruder and was vented in the first zone at 18–20 in.Hg. The conditions in the water chamber are maintained at 30 to 60 psig and at a temperature of between 80° and 130° F. It is noted that venting is used. In addition to these conditions, calcium oxide was added to entrap any water in the foaming agent components.

The pelletized concentrate produced is a uniform pellet in size and shape, showing no foaming of the pellet.

EXAMPLE 9

An endothermic encapsulated foaming agent concentrate is produced with polystyrene as the carrier resin at a chemical foaming agent concentration of 25 wt %. A specific formulation consists of the following:

a) 74.5 wt % polystyrene;

b) 10.7 wt % citric acid;

c) 15.3 wt % of a dihydroxy aluminum sodium carbonate (DASC);

d) 0.5 wt % calcium oxide.

Component b) and component c) are treated as set forth in Example 7 above.

The component a) and the pretreated components b) and c) together with the calcium oxide are premixed in a Henschel mixer and then introduced into an extruder as described in FIG. 1. The extruder is a twin screw Werner & Pfleiderer extruder and was vented in the first zone at 18–20 in.Hg. The conditions in the water chamber are maintained at 30 to 60 psig and at a temperature of between 80° and 120° F. It is noted that venting is used. In addition to these conditions, calcium oxide was added to entrap any water in the foaming agent components.

The pelletized concentrate produced is a uniform pellet in size and shape, showing no foaming of the pellet.

EXAMPLE 10

An endothermic encapsulated foaming agent concentrate is produced with an ionomer resin (Allied Signal Ionomer 272) as the carrier resin at a chemical foaming agent concentration of approximately 55 wt %. A specific formulation consists of the following:

a) 43.7 wt % Ionomer resin (Allied Ionomer 272);

b) 23 wt % citric acid;

c) 32.8 wt % of a mixture of sodium bicarbonate and dihydroxy aluminum sodium carbonate (DASC);

d) 0.5 wt % calcium oxide.

Component b) and each component of component c) are treated as set forth in Example 7 above.

The component a) and the pretreated components b) and c) together with the calcium oxide are premixed in a Henschel mixer and then introduced into an extruder as described in FIG. 1. The extruder is a twin screw Werner & Pfleiderer extruder and was vented in the first zone at 18–20 in.Hg. The conditions in the water chamber are maintained at 30 to 60 psig and at a temperature of between 60° and 110° F. It is noted that venting is used. In addition to these conditions, calcium oxide was added to entrap any water in the foaming agent components.

The pelletized concentrate produced is a uniform pellet in size and shape, showing no foaming of the pellet.

EXAMPLE 11

An endothermic encapsulated foaming agent concentrate is produced with an polypropylene resin as the carrier resin at a chemical foaming agent concentration of approximately 25 wt %. A specific formulation consists of the following:

a) 74.5 wt % of a mixture of polyethylene and polypropylene (the polypropylene a product of Exxon Chemical);

b) 10.3 wt % citric acid;

c) 14.7 wt % of dihydroxy aluminum sodium carbonate (DASC);

d) 0.5 wt % calcium oxide.

Component b) and each component of component c) are treated as set forth in Example 7 above.

The component a) and the pretreated components b) and c) together with the calcium oxide are premixed in a Henschel mixer and then introduced into an extruder as described in FIG. 1. The extruder is a twin screw Werner & Pfleiderer extruder and was vented in the first zone at 18–20 in.Hg. The conditions in the water chamber are maintained at 30 to 60 psig and at a temperature of between 100° and 130° F. It is noted that venting is used. In addition to these conditions, calcium oxide was added to entrap any water in the foaming agent components.

The pelletized concentrate produced is a uniform pellet in size and shape, showing no foaming of the pellet.

EXAMPLE 12

An endothermic encapsulated foaming agent concentrate is produced with an polystyrene resin as the carrier resin at a chemical foaming agent concentration of approximately 10 wt %. A specific formulation consists of the following:

a) 89.75 wt % of polystyrene (a product of Huntsman Chemical);
b) 8.00 wt % sodium borohydride (a product of Morton International);
c) 2.00 wt % stearic acid (a product of Witco Chemical);
d) 0.25 wt % calcium oxide.

Component b) is treated with between 3 and 10 wt % GTS and component c) is treated as set forth in Example 7 above.

The component a) and the pretreated components b) and c) together with the calcium oxide are premixed in a Henschel mixer and then introduced into an extruder as described in FIG. 1. The extruder is a twin screw Werner & Pfleiderer extruder and was vented in the first zone at 18–20 in.Hg. The conditions in the water chamber are maintained at 10 to 60 psig and at a temperature of between 40° and 130° F. In addition to these conditions, calcium oxide was added to entrap any water in the foaming agent components. The pelletized concentrate produced is a uniform pellet in size and shape with no collapsed pellets. This concentrate is a complete additive package with the base, sodium borohydride, and the acid, stearic acid, combined into a single pellet; contrary to the salt and pepper blends available commercially.

EXAMPLE 13

An endothermic encapsulated foaming agent concentrate is produced with an ionomer resin as the carrier resin at a chemical foaming agent concentration of approximately 20 wt %. A specific formulation consists of the following:

a) 79.75 wt % of Allied 272 Ionomer (a product of Allied Signal);
b) 16.00 wt % sodium borohydride (a product of Morton International);
c) 4.00 wt % stearic acid (a product of Witco Chemical);
d) 0.25 wt % calcium oxide.

Component b) is treated with between 3 and 10 wt % GTS and component c) is treated as set forth in Example 7 above.

The component a) and the pretreated components b) and c) together with the calcium oxide are premixed in a Henschel mixer and then introduced into an extruder as described in FIG. 1. The extruder is a twin screw Werner & Pfleiderer extruder and was vented in the first zone at 18–20 in.Hg. The conditions in the water chamber are maintained at 10 to 60 psig and at a temperature of between 40° and 130° F. In addition to these conditions, calcium oxide was added to entrap any water in the foaming agent components. The pelletized concentrate produced is a uniform pellet in size and shape with no collapsed pellets. This concentrate is a complete additive package with the base, sodium borohydride, and the acid, stearic acid, combined into a single pellet; contrary to the salt and pepper blends available commercially.

These examples are merely illustrative of the present invention and many modifications and variations are possible.

We claim:

1. A process for the treating of surfaces of an additive having the propensity to be hydrophilic and which is added to thermoplastics selected from the group consisting essentially of polyolefins, polystyrenes, ionomers and polycarbonates comprising:

blending glycerol tristearate with said additive in a high intensity mixer for less than 5 minutes at ambient conditions.

2. A process according to claim 1 wherein between 0.5 wt % and 10 wt % of said glcerol tristearate is blended.

3. A process according to claim 1 wherein said additive is a foaming agent.

4. A process for the treating of surfaces of an additive having the propensity to be hydrophilic comprising:

blending glycerol tristearate with an acid additive, which is to be added to thermoplastics selected from the group consisting essentially of polyolefins, polystyrenes, ionomers and polycarbonates, in a high intensity mixer for less than 5 minutes at ambient conditions.

5. A process according to claim 4 wherein said acid is a chemical foaming agent.

\* \* \* \* \*